US008981903B2

(12) United States Patent
Daniels et al.

(10) Patent No.: US 8,981,903 B2
(45) Date of Patent: Mar. 17, 2015

(54) DEVICE FOR MARKING OUT BURIED OBJECTS

(75) Inventors: Nickolas Daniels, Brookfield, IL (US); Christopher Ziolkowski, Elmhurst, IL (US); Frank Hennessey, Arlington Heights, IL (US)

(73) Assignee: Gas Technology Institute, Des Plaines, IL (US)

( * ) Notice: Subject to any disclaimer, the term of this patent is extended or adjusted under 35 U.S.C. 154(b) by 1036 days.

(21) Appl. No.: 12/774,233

(22) Filed: May 5, 2010

(65) Prior Publication Data

US 2011/0273178 A1 Nov. 10, 2011

(51) Int. Cl.
*H04Q 5/22* (2006.01)
*G01C 15/04* (2006.01)

(52) U.S. Cl.
CPC ....................................... *G01C 15/04* (2013.01)
USPC .............................. 340/8.1; 340/1.1; 340/10.1

(58) Field of Classification Search
CPC ....... E04H 13/003; E21B 41/00; E21B 17/00; G01C 15/04; G01C 15/002
USPC ........... 116/209, 210, 211; 324/326, 67, 329; 40/660, 642.02, 661.11; 340/1.1, 6.1, 340/8.1, 10.1–10.6, 572–572.9, 10.4, 10.51, 340/539.13
See application file for complete search history.

(56) References Cited

U.S. PATENT DOCUMENTS

| 5,671,814 | A | * | 9/1997 | Smith .............................. 173/91 |
| 6,138,501 | A |   | 10/2000 | Rastegar |
| 6,571,885 | B2 | * | 6/2003 | Lee et al. .......................... 173/1 |
| 7,081,820 | B2 | * | 7/2006 | Minarovic ................. 340/572.8 |
| 2007/0209647 | A1 | * | 9/2007 | MacCarty ....................... 124/56 |

* cited by examiner

*Primary Examiner* — James Yang
(74) *Attorney, Agent, or Firm* — Pauley Petersen & Erickson

(57) ABSTRACT

A method and apparatus for marking the location of a buried object in which the location of the buried object is determined and a barhole driver or plunger bar having a detachable plug element and a marking material for marking the location of the buried object is driven into the ground proximate the location of the buried object. The detachable plug element detaches from the plunger bar as the plunger bar is removed from the ground, leaving a substantially continuous path of the marking material in the ground extending substantially continuously from proximate the detachable plug element to the ground surface.

16 Claims, 5 Drawing Sheets

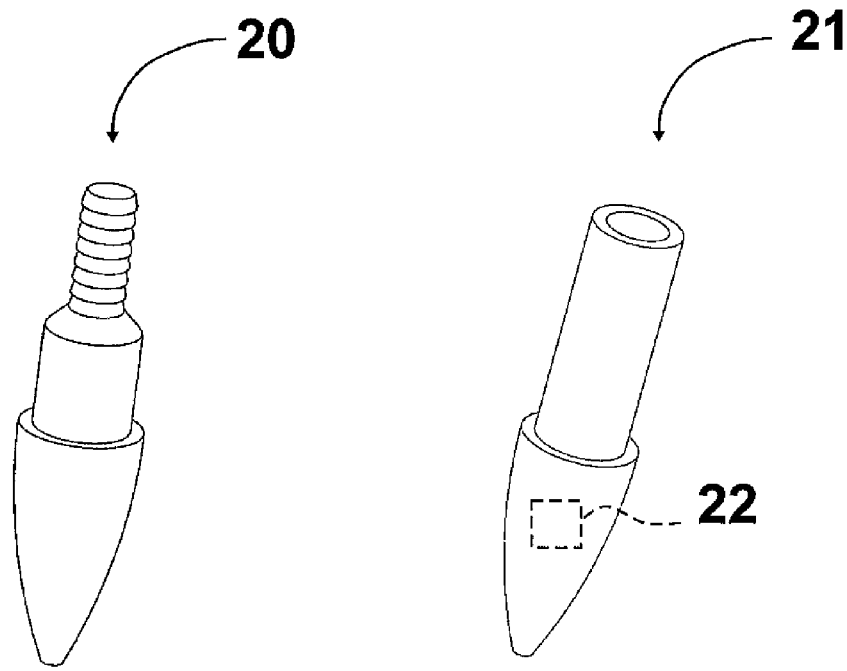

DEVICE FOR MARKING OUT BURIED OBJECTS

BACKGROUND OF THE INVENTION

1. Field of the Invention

This invention relates to a method and apparatus for marking the location of buried objects. More particularly, this invention relates to barhole drivers or plunger bars for creating holes from above ground to an underground location proximate a buried object and for marking the location of the buried object.

2. Description of Related Art

In-ground pipelines are used for a variety of purposes. For example, and without an unnecessary limitation, in-ground pipelines are used extensively in the transmission of various materials between selected points for locations. Natural gas is one example of a material frequently transmitted via in-ground pipelines.

It is known that damage to in-ground pipelines can occur directly as a result of acts of nature such as earthquakes and landslides. The damage resulting from in-ground pipelines as a result of the occurrence of such events typically occurs on a sufficiently large scale such that multiple pipe joints are affected and detection of the occurrence of such damage is relatively easy. However, pipeline damage can also occur due to the activity of a third-party, i.e. a party other than the owner or operator of the pipeline. Such damage is known as "third-party damage." When the damage due to an act of a third party causes an immediate rupture of a pipe, little can be done via on-line monitoring to prevent an ensuing incident. However, many third-party contacts with pipelines may cause damage that does not result in an immediate pipeline failure but rather cause damage that may, with time, lead to a pipe failure such as in the form of a leak or a catastrophic rupture. The occurrence of such third-party contact and the effective detection thereof has proven to be a persistent problem. While sounds associated with contact with the pipeline can be transmitted through the pipeline and detected at substantial distances from the point of contact via highly sensitive acoustic sensors, the high sensitivity of such sensors can generate a significant number of false alarms arising from sources other than by contact with the pipeline. For example, sources such as passing vehicles and weather conditions, such as thunder and rain, can produce to a normal sound detection and monitoring method and system.

In view of the consequences of the failure of an in-ground pipeline due to third-party contact, particularly when coupled with the extensive construction related with urban expansion and encroachment of the right-of-way commonly associated with many of such in-ground pipelines, the importance of preventing such third-party contacts is apparent. Typically, the primary approach to preventing such third-party contact has been to mark the location of the in-ground pipeline through the use of above-ground means visible to excavators. Current methods of marking an excavation site, which include the use of small flags or paint, are applied at the surface above the location of the in-ground pipeline. However, such markings frequently become lost when excavation begins. Other methods of marking an excavation site include, for example, the placement of RFID devices in the ground proximate the in-ground pipeline, which devices are detectable from above ground. Disadvantageously, current methods for the placement of RFID devices in the ground involve excavation or drilling. And, finally, shifting in the ground caused by ground disturbances, such as earthquakes, may result in a relocation of the marking means relative to the in-ground pipeline as a result of which the marking means is no longer indicative of the location of the in-ground pipeline.

Barhole drivers, also known as plunger bars, are used to create holes in soil, concrete, and the like. The most common use of plunger bars is for making holes in the ground in order to detect and determine the location of gas leaks from natural gas utility pipelines. Conventional plunger bars comprise three basic components, a solid rod having a tip for promoting ground penetration and a drive means connected with the solid rod for driving the tip and the rod into the ground. However, when the plunger bar is removed from the ground, the hole created by the plunger bar quickly closes up after the bar is withdrawn.

SUMMARY OF THE INVENTION

It is one object of this invention to provide a method and apparatus for marking the location of buried objects, such as in-ground pipelines, which is visible from above ground.

It is another object of this invention to provide a method and apparatus for marking the location of buried objects which persists over time, notwithstanding changes that may occur in the ground due to excavation and other ground shifting events.

These and other objects of this invention are addressed by a method for marking a location of a buried object in which the location of the buried object is determined and a barhole driver or plunger bar comprising a detachable plug element and marking means for marking the location of the buried object is driven into the ground proximate the location of the buried object. The detachable plug element detaches from the plunger bar as the plunger bar is removed from the ground, leaving the now detached plug element and the marking means in the ground, which marking means extend substantially continuously from proximate the detached plug element to the ground surface. The marking means are in the form of a material or article having a color that is visibly distinguishable from the color of the surrounding environment. Due to the visibly distinguishable color of the marking material as well as the substantially continuous extension of the marking material from proximate the detachable plug element, which itself is proximate the buried object, to the ground surface, the marker is clearly visible from above ground. In addition, in the event of excavation or other disturbance of the ground above the buried object, the marker remains visible in the excavated ground.

BRIEF DESCRIPTION OF THE DRAWINGS

These and other objects and features of this invention will be better understood from the following detailed description taken in conjunction with the drawings, wherein:

FIG. 2 is a perspective view of a solid detachable plug employed in the apparatus for marking the location of buried objects in accordance with one embodiment of this invention;

FIG. 3 is a perspective view of a hollow detachable plug employed in the apparatus for marking the location of buried objects in accordance with one embodiment of this invention;

DETAILED DESCRIPTION OF THE PRESENTLY PREFERRED EMBODIMENTS

The method and apparatus of this invention are used for providing a means for marking the location of buried objects from a location above ground so as to provide notification to excavators and others desiring to implant objects in the ground above the buried objects of the presence of the buried objects. As used herein, the term "buried object" refers to any below ground object for which notification of the presence of the object is desired including, but not limited to, underground utilities such as gas and water pipelines and buried electrical lines. The apparatus places some form of marking material into the ground above the buried object, thereby enabling the buried object to remain properly marked, even while excavation or other subterranean activity is in progress.

In accordance with one embodiment, the method of this invention for marking a location of a buried object comprises determining a location of the buried object, providing a solid rod or a tubular member comprising marking means for marking the location of the buried object and having a detachable plug element connected with a driven end of the solid rod or tubular member and having a reciprocating handle connected with a driving end of the solid rod or tubular member, and driving the detachable plug element into the ground proximate the location of the buried object. Thereafter, the detachable plug element detaches from the solid rod or tubular member proximate the location of the buried object as the solid rod or tubular member is removed from the ground, leaving the marking means in the ground which extends from proximate the detachable plug element to the ground surface.

Figure 1:
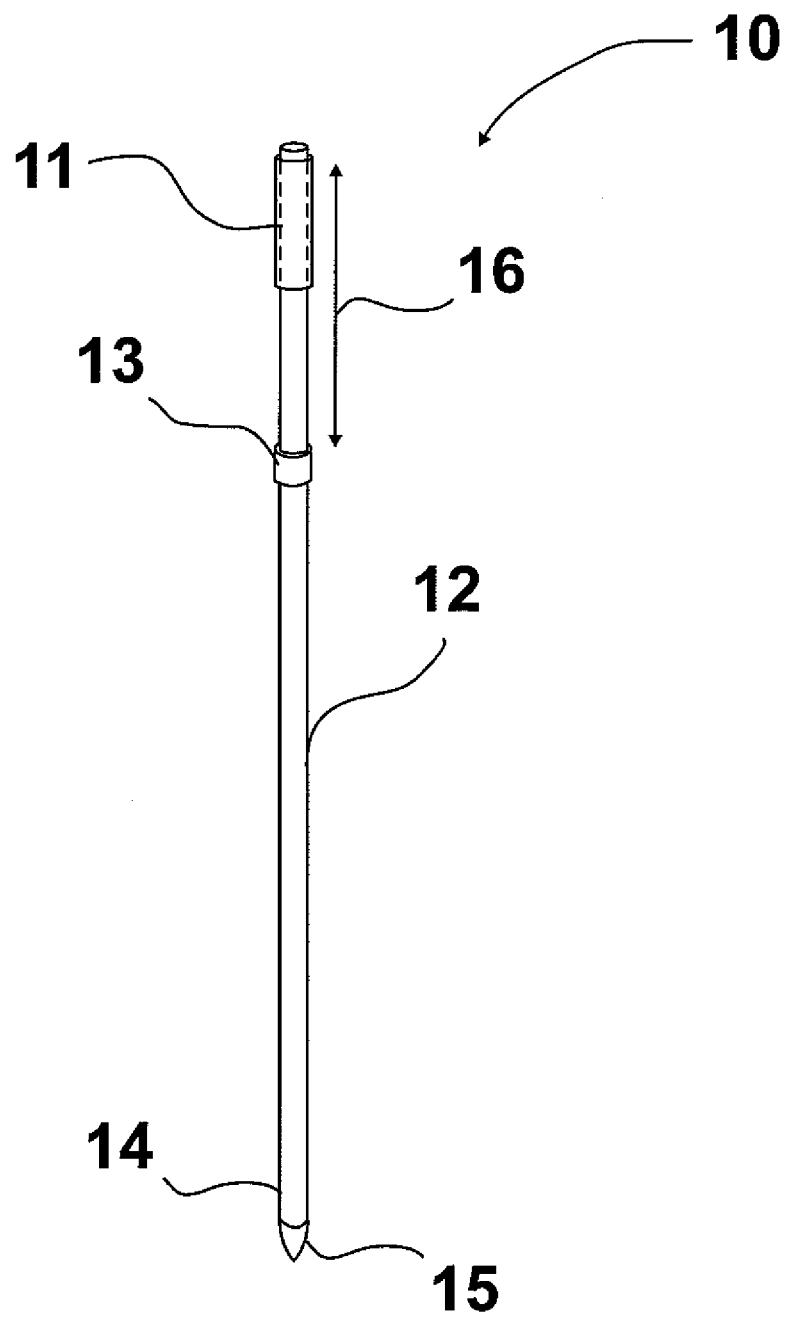
FIG. 1 is a lateral view of an apparatus for marking the location of buried objects in accordance with one embodiment of this invention.

The apparatus employed in the method of this invention is a variation of a conventional barhole driver that has been modified to facilitate leaving marking material in the ground. A conventional barhole driver is a solid bar or rod which is driven into the ground by a reciprocating, weighted handle and then withdrawn. The apparatus 10 in accordance with one embodiment of this invention as shown in FIG. 1 comprises a rigid elongated member 12 having a drive end 13 and a driven end 14. Connected with the driven end of the rigid elongated member is a detachable plug 15 which, upon removal of the apparatus from the ground, detaches in the ground proximate the buried object. Connected with the drive end 13 of the rigid elongated member drive element 11 which moves in the directions indicated by arrows 16 in order to drive the rigid elongated member into the ground.

FIG. 2 shows a solid detachable plug element 20 in accordance with one embodiment of this invention, and FIG. 3 shows a hollow detachable plug element 21 in accordance with one embodiment of this invention. In accordance with one embodiment of this invention, the marking means comprises a radio-frequency identification device (RFID) 22 disposed within the hollow detachable plug element 21 as shown in FIG. 3, which remains in the ground upon removal of the rigid elongated member. The RFID is rapidly locatable and uniquely identifiable from above ground by conventional means known to those skilled in the art, even if the surface portion of additional marking means extending from proximate the detachable plug element to the ground surface has become eradicated.

Figure 4:
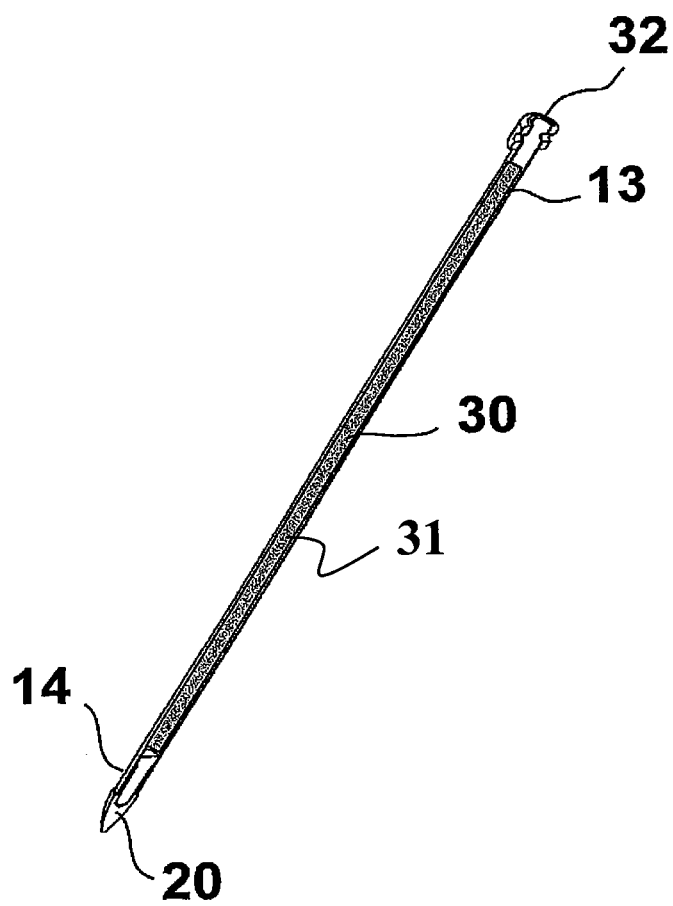
FIG. 4 is a diagram of the apparatus for marking the location of buried objects showing the inside of the apparatus in accordance with one embodiment of this invention.
Figure 5:
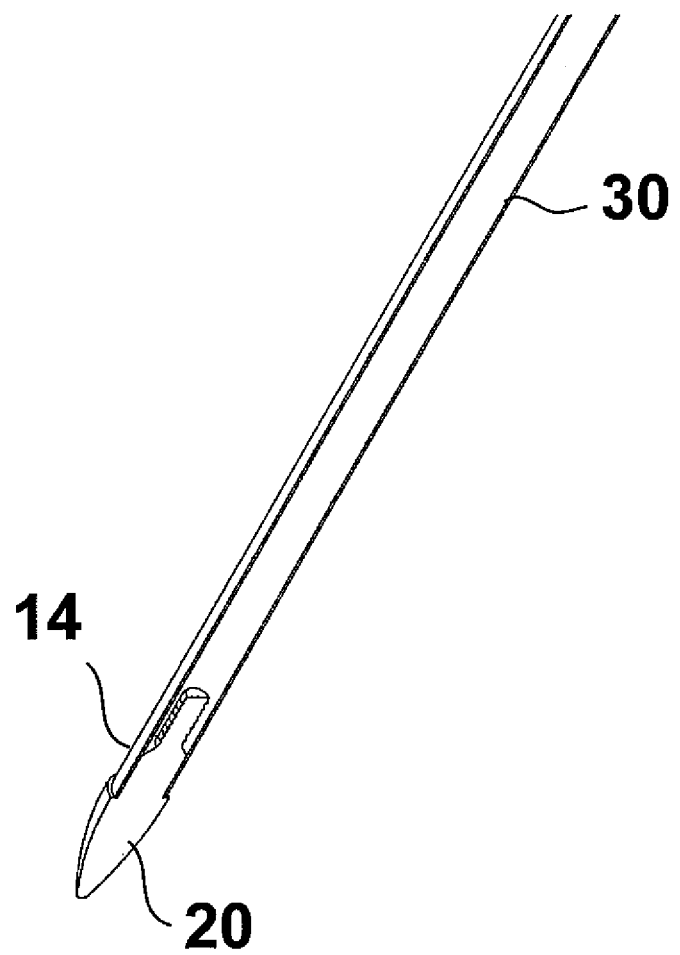
FIG. 5 is a diagram of the driven end of the apparatus for marking the location of buried objects employing the detachable plug of FIG. 3 in accordance with one embodiment of this invention.

In accordance with one embodiment of this invention, the rigid elongated member is in the form of a rigid tubular member 30 as shown in FIGS. 4 and 5. Marking means are disposed within the rigid tubular member and remain in the ground upon detachment of the detachable plug element and removal of the rigid tubular member. In accordance with one embodiment of this invention, the marking means comprises a granular material 31, for example, gravel, having a color that is visibly distinguishable from the color of the surrounding environment. In accordance with one embodiment of this invention, reciprocating drive element 11 is detachable from the rigid tubular member, exposing a port 32 that allows the rigid tubular member to be filled with the granular material either before or after the rigid tubular member has been driven into the ground. When the rigid tubular member is withdrawn from the ground, the detachable plug remains in the ground and the granular material fills in the void left by the withdrawal of the bar. In this way, a column of the brightly colored granular material extending from proximate the buried object up to the ground surface is left behind. The brightly colored granular material remains visible even after some of the column has been removed by excavation.

In accordance with another embodiment of this invention, the marking means comprises a plurality of paintball capsules of sufficiently small diameter to fit within the rigid tubular member. In addition to having brightly colored exteriors, the capsules will break or burst upon contact with the excavation equipment, leaving marks on the blades of the excavation equipment to alert operators of the presence of the buried object.

Figure 6:
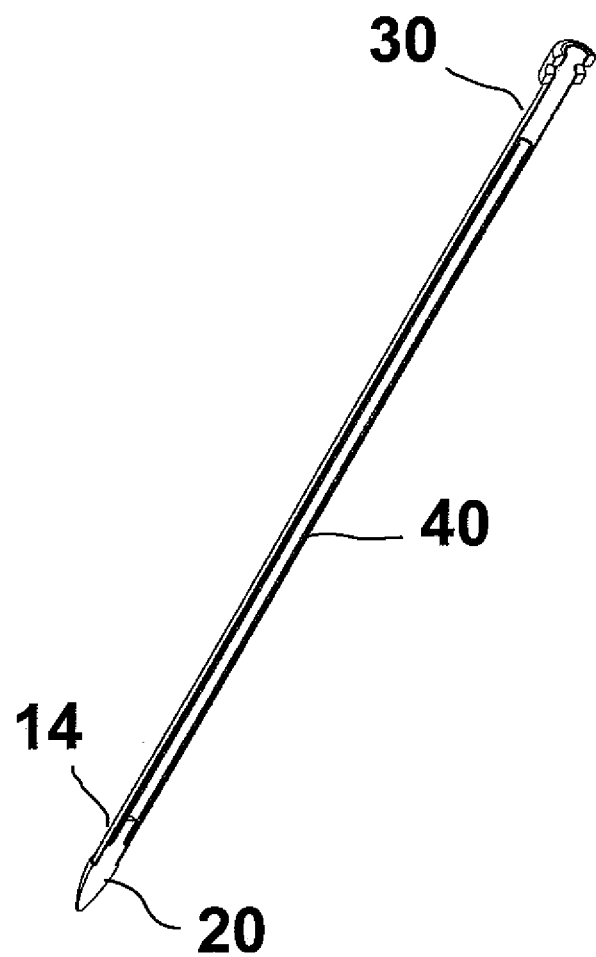
FIG. 6 is a diagram of the apparatus for marking the location of buried objects showing the inside of the apparatus in accordance with another embodiment of this invention.

In accordance with one embodiment of this invention, the marking means comprises a flexible tubular element 40 disposed inside the rigid tubular member 30 as shown in FIG. 6. In accordance with this embodiment, the detachable plug element is connected with the end of the flexible tubular element 40 proximate the driven end 14 of the rigid tubular member, thereby retaining the flexible tubular element within the rigid tubular member as the rigid tubular member is driven into the ground. When the rigid tubular member is withdrawn, both the detachable plug and the flexible tubular element remain embedded in the ground. To further enhance the visibility, the flexible tubular element is brightly colored with a color visibly distinguishable from the color of the surrounding ground.

In accordance with yet a further embodiment of this invention, rigid elongated member 12 is a solid rod. In accordance with this embodiment, the marking means comprises a brightly colored, preferably flexible, tubular element or sleeve disposed around the exterior of the solid rod which remains in the ground together with the detachable plug element upon withdrawal of the solid rod. Any flexible tubular element of sufficient strength to withstand the surrounding environment may be employed, for example, brightly colored small diameter polyethylene tubing.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for marking a location of a buried object comprising the steps of:
   determining a location of a buried object;
   providing one of a rigid solid non-hollow rod and a rigid tubular member comprising marking means for marking said location of said buried object and having a detachable plug element connected at and directly extending from a driven end of said one of said rigid solid non-hollow rod and said rigid tubular member and having a reciprocating handle connected with a driving end of said one of said rigid solid non-hollow rod and said rigid tubular member, wherein said marking means comprises a marking material comprising a granular material comprising gravel having a color visibly distinguishable from a surrounding environment;

driving said detachable plug element and said driven end of said one of said rigid solid non-hollow rod and said rigid tubular member into a ground proximate said location of said buried object; and removing said driven end of said one of said rigid solid non-hollow rod and said rigid tubular member from said ground, leaving said detachable plug element and said marking means in said ground, said marking means extending from proximate said detachable plug element to a ground surface.

2. The method of claim 1, wherein said marking material is contained within said rigid tubular member.

3. The method of claim 2, wherein said marking material comprises a plurality of particles having a color visibly distinguishable from a surrounding ground color.

4. The method of claim 3, wherein said plurality of particles are introduced into an interior of said rigid tubular member following said driving of said detachable plug element into said ground.

5. A method for marking a location of a buried object comprising the steps of:

determining a location of a buried object;

providing a rigid solid non-hollow rod comprising marking means for marking said location of said buried object and having a detachable plug element connected at and directly extending from a driven end of said rigid solid non-hollow rod and having a reciprocating handle connected with a driving end of said rigid solid non-hollow rod;

driving said detachable plug element and said driven end of said rigid solid non-hollow rod into a ground proximate said location of said buried object; and removing said driven end of said rigid solid non-hollow rod from said ground, leaving said detachable plug element and said marking means in said ground, said marking means extending from proximate said detachable plug element to a ground surface:

wherein said marking means comprises a removable sleeve surrounding said rigid solid non-hollow rod and extending from proximate said plug end to said drive end, said removable sleeve having a color visibly distinguishable from a surrounding environment.

6. The method of claim 1, wherein said buried object is an underground utility.

7. The method of claim 1, wherein said detachable plug element comprises a RFID device.

8. An apparatus for marking a location of a buried object comprising: a rigid elongated member having a drive end and an opposite plug end; wherein said rigid elongated member is a solid non-hollow rod; a detachable plug connected at the end of said plug end and directly extending from said plug end; a reciprocating driving element connected with said drive end; and marking means for marking a location of said buried object, said marking means comprises a removable sleeve surrounding said solid non-hollow rod and extending from proximate said plug end to said drive end, said removable sleeve having a color visibly distinguishable from a surrounding environment, wherein said removable sleeve serves as and provides a marker extending from proximate said location of said buried object to a ground surface location upon withdrawal of said rigid elongated member from beneath said ground surface location.

9. The apparatus of claim 8, wherein said reciprocating drive element is detachable from said drive end.

10. The apparatus of claim 8, wherein said detachable plug forms a cavity within said detachable plug and an RFID is disposed within said cavity.

11. An apparatus for marking a location of a buried object comprising: a rigid elongated member having a drive end and an opposite plug end; wherein said rigid elongated member is a tubular member; a detachable plug connected at the end of said plug end and directly extending from said plug end; a reciprocating driving element connected with said drive end; and marking means for marking a location of said buried object, said marking means is disposed within said tubular member, wherein said marking means comprises a granular material comprising gravel having a color visibly distinguishable from a surrounding environment and provides a marker extending from proximate said location of said buried object to a ground surface location upon withdrawal of said rigid elongated member from beneath said ground surface location.

12. The apparatus of claim 11, wherein said reciprocating drive element is detachable from said drive end.

13. The apparatus of claim 11, wherein said detachable plug forms a cavity within said detachable plug and an RFID is disposed within said cavity.

14. The method of claim 5, wherein said sleeve has an exterior color visibly distinguishable from a surrounding ground color.

15. The method of claim 5, wherein said buried object is an underground utility.

16. The method of claim 5, wherein said detachable plug element comprises a RFID device.

* * * * *